United States Patent
Harris

(10) Patent No.: US 7,882,551 B2
(45) Date of Patent: Feb. 1, 2011

(54) TECHNIQUES FOR ENTRY OF LESS THAN PERFECT PASSWORDS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 19 days.

(21) Appl. No.: 12/264,195

(22) Filed: Nov. 3, 2008

(65) Prior Publication Data

US 2009/0064278 A1 Mar. 5, 2009

Related U.S. Application Data

(63) Continuation of application No. 11/033,012, filed on Jan. 10, 2005, now Pat. No. 7,467,403.

(60) Provisional application No. 60/535,204, filed on Jan. 9, 2004.

(51) Int. Cl.
*G06F 21/00* (2006.01)
*H04L 9/32* (2006.01)

(52) U.S. Cl. ............... 726/6; 726/7; 726/18; 726/19

(58) Field of Classification Search ........... None
See application file for complete search history.

(56) References Cited

U.S. PATENT DOCUMENTS

| | | | | |
|---|---|---|---|---|
| 4,138,719 A | | 2/1979 | Swanstrom et al. | 358/1.18 |
| 4,926,491 A | | 5/1990 | Maeda et al. | 382/155 |
| 5,365,574 A | * | 11/1994 | Hunt et al. | 379/88.02 |
| 5,394,471 A | | 2/1995 | Ganesan et al. | 713/183 |
| 5,430,827 A | | 7/1995 | Rissanen | 704/272 |
| 6,026,491 A | | 2/2000 | Hiles | 726/18 |
| 6,094,632 A | | 7/2000 | Hattori | 704/239 |
| 6,263,447 B1 | | 7/2001 | French et al. | 726/5 |
| 6,282,658 B2 | | 8/2001 | French et al. | 726/7 |
| 6,321,339 B1 | | 11/2001 | French et al. | 726/2 |
| 6,560,352 B2 | | 5/2003 | Rowe et al. | 382/115 |
| 6,857,073 B2 | | 2/2005 | French et al. | 713/168 |
| 7,234,156 B2 | | 6/2007 | French et al. | 726/2 |
| 7,467,403 B2 | * | 12/2008 | Harris | 726/6 |
| 2009/0158406 A1 | * | 6/2009 | Jancula et al. | 726/5 |

FOREIGN PATENT DOCUMENTS

| | | |
|---|---|---|
| EP | 0856836 A2 | 8/1998 |
| WO | WO 02/084605 A2 | 10/2002 |

* cited by examiner

*Primary Examiner*—Christopher A Revak
(74) *Attorney, Agent, or Firm*—Law Office of Scott C. Harris, Inc.

(57) ABSTRACT

A technique of allowing entry of the password which is not 100% correct. This password would be used to verify identity and/or login information in low security techniques. The password is scored relative to the correct password. The scoring can take into effect least mean squares differences, and other information such as letter groups, thereby detecting missed characters or extra characters, as well as shift on the keyboard.

12 Claims, 2 Drawing Sheets

US 7,882,551 B2

TECHNIQUES FOR ENTRY OF LESS THAN PERFECT PASSWORDS

CROSS RELATED APPLICATIONS

This application is a continuation application of 11/033,012 filed Jan. 10, 2005, now issued as U.S. Pat. No. 7,467,403 issued Dec. 16, 2008 which claims priority to U.S. Provisional Application No. 60/535,204 filed Jan. 9, 2004.

BACKGROUND

Passwords are used as a form of personal identification to allow a user access to a specified resource.

Security can be balanced against the inconvenience to a user for accessing that security. For example, it may be inconvenient for a user to enter long or difficult passwords. The need to enter a difficult password is inconvenient to the user. However, the user may accept that difficulty, because of the need to maintain the security of a transaction or database.

Passwords can secure access to specified resources. The resource can be, for example, a local computer system, or a web site or membership site which requires access, or even physical access to a premises. Sometimes, however, less security may be needed. For example, certain web sites require login, but only allow a user access to less personal and/or secure information. For example, a web site may require login to receive news or other personalization information. Also, sometimes log in to a web site may be dependent on the actual computer that is being logged in, in which case it is unlikely that an unauthorized user is actually logging in.

Other situations where the odds of unauthorized entry are low include a web site where a timeout has occurred after certain amounts of time. In all of these situations, it may be desirable to accept lower security.

Passwords, as described herein, may take different forms, and may include, for example, an alphanumeric password, a personal identification number or "pin", or specified sequences of other types.

SUMMARY

The present application teaches acceptance of a password which is less than perfect, so long as the difference between the entered password and the actual password meets certain criteria.

According to one aspect, the entered password is correlated against the correct password, using image correlation techniques, and a least means squares difference is obtained. So long as the least means squares difference is less than a specified amount, access to the resource is granted.

According to another aspect, a determination is made up how many letters are incorrect, and patterns of incorrect letters. For example, a position on the keyboard is determined, or an extra letter, or a missing letter.

BRIEF DESCRIPTION OF THE DRAWINGS

These and other aspects will now be described in detail with reference to the accompanying drawings, wherein.

DETAILED DESCRIPTION

Figure 1:
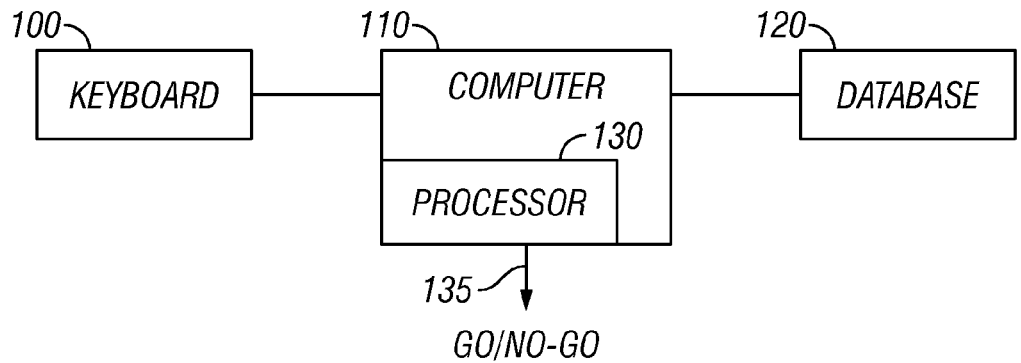
FIG. 1 shows a basic block diagram of the system.

The basic system is shown in FIG. 1. A user interface 100, such as a keyboard, is connected to a general or specific purpose computer 110. The computer can be, for example, a special access device which is configured only to allow access to a specified resource. For example, the computer can be a specific purpose entry granting device. The computer is also connected to a database 120 which stores information indicative of correct password(s). The computer includes a processing part 130 that processes the password entered on the keyboard against the password entered in the database to produce a go/no go indication shown as 135. This go/no go indication may be part of a signal that controls the access to the resource.

Figure 2:
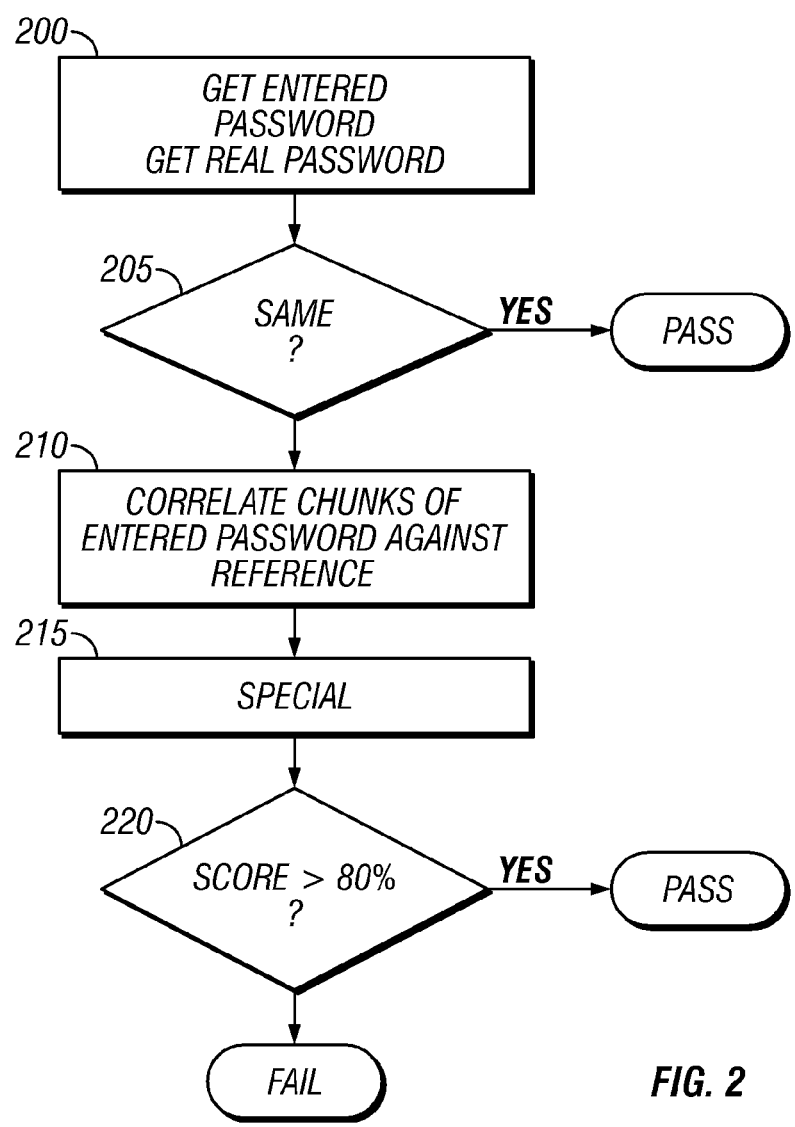
FIG. 2 shows a flowchart of password acceptance for the system.

The computer processor operates according to the specific flowchart shown in FIG. 2. At 200, the computer gets the entered password and actual password. 205 determines if the passwords are identical, and if so signals a pass. However, if the passwords are not identical, then 210 uses image correlation techniques to correlate chunks of the entered password against the reference password. That is, even though the entered password is text, it is treated as being different blocks of sequences, and the pattern of those sequences is compared against the pattern of sequences in the actual password. This technique is analogous to the way that an image is processed. For example, letters and locations may be correlated against each other, followed by neighborhoods, 2 letter groups, 3 letter groups and the like.

Figure 3:
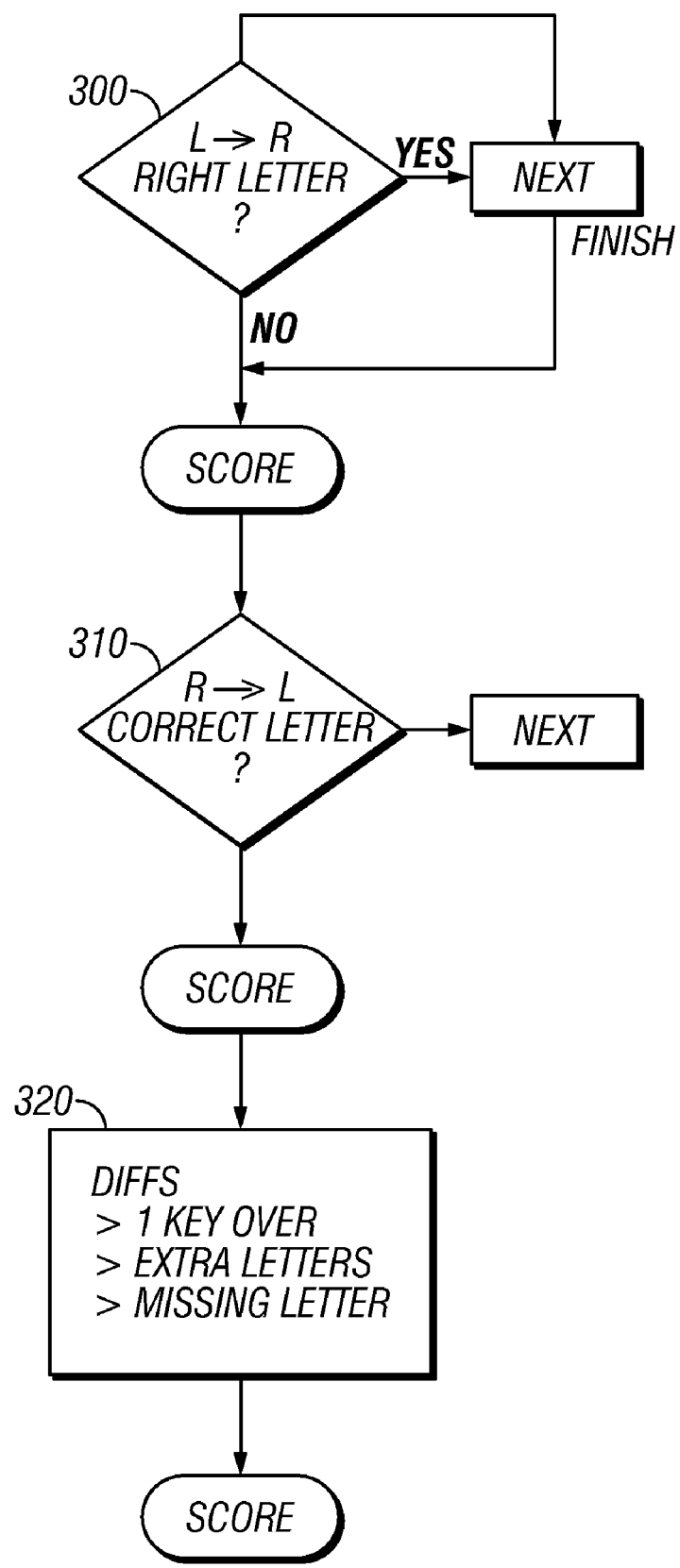
FIG. 3 shows a flowchart of scanning the password to determine correlation with the correct password.

The correlation may be used to determine a least mean squares distance between the entered password and the reference password. Many different ways of finding the least mean squares difference are known, and any of these techniques may be used. However, a specific technique is described herein with reference to FIG. 3. Special processing techniques are carried out at 215, a special processing technique being techniques which are specific to the entry of data via a keyboard. This produces a score which is output. The score is compared with a specified value, here 80%. If the score is higher than 80%, then access to the resource is granted. If the score is lower than 80%, then access to the resource is denied. A specific technique of correlating is shown in FIG. 3. Note that this correlation need only be carried out if exact matches between the passwords are not found.

FIG. 3 shows a system which correlates along the letter from left to right (300) then right to left (310). This determines the number of exact matches between letters both at the beginning and end of the word. At 320, the differences between the letters are analyzed. These differences may include whether the letter that was entered was shifted on the keyboard relative to where it should be, whether there was an extra letter, or whether there was a missing letter. These most common errors are accommodated in this way. Each of the different errors is associated with a score, and the overall score is used as the output value.

Other modifications are possible. For example, while least mean squares has been described, it should be understood that any technique which can be used to analyze patterns of sequences, and more specifically, any technique which has been used to analyze/identify images or portions of images, can be used in this system. This system uses a "good enough" measure to determine whether the password that is entered sufficiently closely matches the stored password, in a way which provides reasonable, but not perfect certainty that the user has entered the correct password. Other embodiments are contemplated, and the disclosure is intended to encompass all embodiments and modifications which might be predictable based on the disclosed subject matter. Also, only those claims which use the words "means for" are intended to be interpreted under 35 USC 112, sixth paragraph. Moreover, no limitations from the specification are intended to be read into any claims, unless those limitations are expressly included in the claims.

The invention claimed is:

1. An apparatus, comprising:
a computer device that accepts a password which has been entered, as an entered password, and compares said entered password with a stored password to determine if said entered password matches with the stored password, said computer device signaling acceptance of the entered password even when the entered password is not exactly the same as the stored password, wherein said signaling acceptance comprises determining a relationship between said entered password and said stored password by correlating portions in the entered password with portions in the stored password, and the relationship is also based on correlating locations of those portions in the entered password with the location of those portions in the stored password, and said computer accepting said entered password if the relationship indicates agreement between the entered password and the stored password by a predetermined amount and signaling the acceptance only when the relationship indicates the agreement by at least the predetermined amount and even when the relationship indicates that the entered password is not exactly the same as the stored password.

2. An apparatus as in claim 1, wherein said relationship is a score that takes into account an analysis of common keyboarding errors.

3. An apparatus as in claim 1, wherein said computer determines a least mean squares difference between the entered password and the stored password, and computer determines said agreement from an amount of said least mean squares difference.

4. An apparatus as in claim 1, wherein said computer carries out said comparing using image correlation techniques.

5. An apparatus, comprising:
a computer that accepts entry of an entered password which has been entered, and compares said entered password with a stored password and signals acceptance of the entered password based on its comparing the entered password with the stored password even when the entered password is not exactly the same as the stored password, wherein said computer compares said passwords by finding neighborhoods of characters that are common in both of said stored password and said entered password.

6. A system, comprising:
a computer, which stores at least one stored item of information which represents a user's access to a resource, and compares said at least one item of information to an entered item of information, which determines differences between said stored item of information and said entered item of information, and accepts the entered item of information based on said differences, even when the entered item of information is not exactly the same as said stored item of information, wherein said computer determines a score related to a difference between said stored item of information and said entered item of information, wherein said score is related to an absolute distance between information in said entered item of information and information in said stored item of information.

7. A system as in claim 6, wherein said item of information is accepted when said score is greater than a specified amount, where said specified amount is less than 100%.

8. A system as in claim 6, wherein said score defines a least mean squares distance between said entered item of information and said stored item of information.

9. A system as in claim 7, wherein said item of information is text.

10. A computer readable non-transitory medium containing a set of instructions for a general-purpose computer, the set of instructions comprising:
instructions to obtain a item of information which represents a user's access to a to an access-controlled item which has been entered;
instructions to access a database of stored items of information;
instructions to compare the entered item of information with at least one item of information in the database;
instructions to determine a score representing similarities between the entered item of information and the stored item of information; and
instructions to accept the entered item of information based on said score and provide access to the access controlled item even when the entered item of information is not exactly the same as the stored item of information, wherein said score defines a least mean squares distance between parts of said entered item of information and parts of said stored item of information.

11. A non-transitory medium as in claim 10, wherein said determine a score determines whether a difference between the entered item of information and the stored item of information includes a plurality of letter groups which are the same to determine extra parts or missing parts.

12. A non-transitory medium as in claim 10, wherein said item of information is text.

* * * * *